A. P. ROUTT.
Ditching-Plow.
No. 17,809.
Patented July 14, 1857.
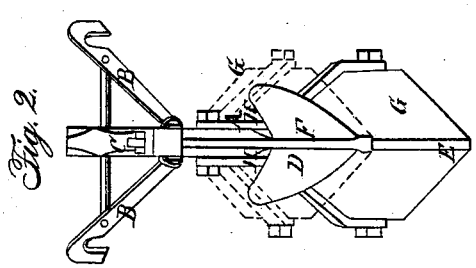
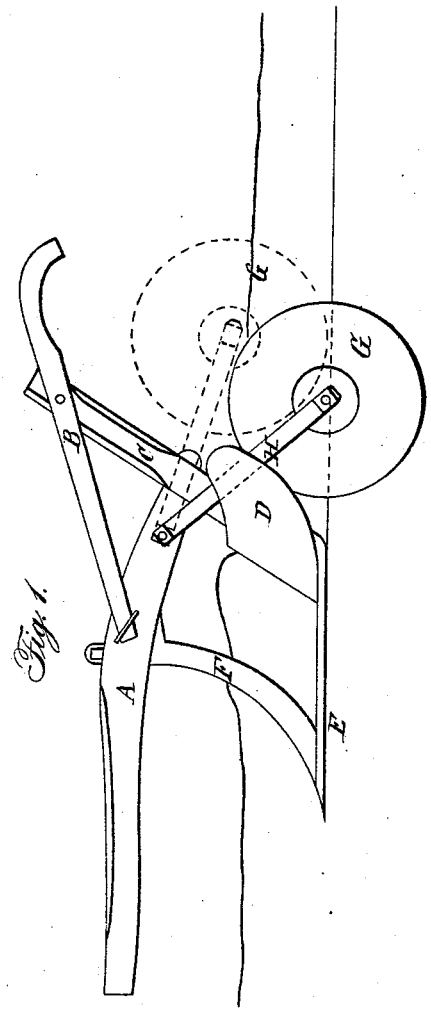
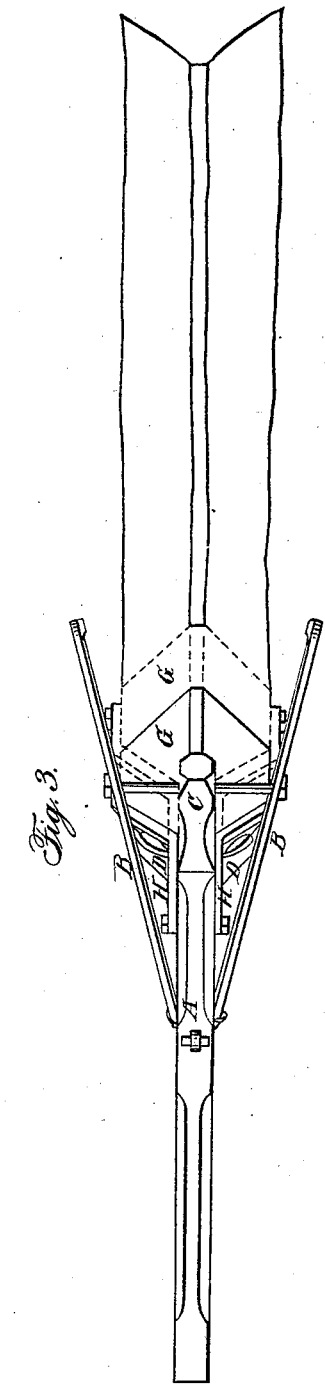

UNITED STATES PATENT OFFICE.

A. P. ROUTT, OF SOMERSET, VIRGINIA.

DRAINING-MACHINE.

Specification forming part of Letters Patent No. 17,809, dated July 14, 1857.

*To all whom it may concern:*

Be it known that I, A. P. ROUTT, of Somerset, in the county of Orange and State of Virginia, have invented a new and useful Improvement in Draining-Machines; and I do hereby declare the following to be a full, clear, and exact description of the same, reference being had to the accompanying drawings, forming part of this specification in which—

Figure 1 is a side elevation of a draining-machine constructed after my invention; Fig. 2, a front view of the same; Fig. 3, a plan or top view of the same.

Similar letters of reference in each of the several figures indicate corresponding parts.

The object of my invention is to provide a simple and cheap draining implement, whereby furrows or drains may be formed in damp marshy soil for the water to run into and be drained off by into creeks or ponds.

The nature of my improvement consists in the employment, in connection with a double-mold-board plow which has a long taper point and colter or cutter attached, of a heavy cast-iron V-shaped or taper roller, said roller being hung so as to run behind and between the two mold-boards, and so as to be capable of revolving and adjusting itself to the different depths at which the plow may be set to cut. By thus using the V-shaped roller behind the plow the soil displaced by the mold-boards is prevented from falling back into the furrow or drain, and thus by once passing over the soil perfect drains or furrows for conducting off the water are formed.

To enable others skilled in the art to make and use my invention, I will proceed to describe its construction and operation.

A represents the beam, B B the handles, C the standard, D D the mold-boards, E the share, and F the colter, of a plow adapted for forming drains or furrows in marshy soil.

G is the V-shaped or taper roller. It is arranged to revolve in a metal frame, H, which is pivoted to the rear part of the beam A, as shown. It will be seen by examining Figs. 1 and 3 of the drawings that the roller runs just behind and between the mold-boards, and that it corresponds in shape with the furrow or drain formed by the plow, and that owing to its being thus arranged and shaped no possible chance exists for the displaced soil to fall back into the furrow or drain formed by the plows, the roller pressing it firm, and thereby forming a permanent wall, as it were, on each side of the drain or furrow from bottom to top, as illustrated in Figs. 1 and 3. By having the roller to turn friction is avoided and the draft to the horses rendered lighter, and by pivoting the frame in which it turns the roller can adjust itself to the different depths to which the plow may be set to enter the soil, as illustrated by full black lines.

What I claim as my invention and desire to secure by Letters Patent, is—

The employment, in connection with a double-mold-board plow, of a heavy V-shaped or taper roller, G, said roller being hung so as to run behind and between the two mold-boards and so as to be capable of revolving and adjusting itself to the different depths at which the plow may be set to cut, substantially as and for the purpose herein set forth.

A. P. ROUTT.

Witnesses:
DANIEL W. KING,
JAS. W. HARRIS.